US009939902B2

(12) United States Patent
Grant et al.

(10) Patent No.: US 9,939,902 B2
(45) Date of Patent: Apr. 10, 2018

(54) HAPTIC CONTROLLER

(71) Applicant: Immersion Corporation, San Jose, CA (US)

(72) Inventors: Danny Grant, Laval (CA); Jean Francois Dionne, Outremont (CA); Aaron Kapelus, Montreal (CA); Razmik Mousakhanian, Montreal (CA); Jamal Saboune, Montreal (CA); William Rihn, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 8 days.

(21) Appl. No.: 14/938,273

(22) Filed: Nov. 11, 2015

(65) Prior Publication Data

US 2016/0132116 A1 May 12, 2016

Related U.S. Application Data

(60) Provisional application No. 62/078,502, filed on Nov. 12, 2014.

(51) Int. Cl.
  *G09G 5/00* (2006.01)
  *G06F 3/01* (2006.01)
  *A63F 13/285* (2014.01)
  *A63F 13/24* (2014.01)
  *G06F 3/0354* (2013.01)

(52) U.S. Cl.
  CPC ............. *G06F 3/016* (2013.01); *A63F 13/24* (2014.09); *A63F 13/285* (2014.09); *G06F 3/03543* (2013.01)

(58) Field of Classification Search
  CPC ................ G06F 3/016; G06F 3/03547; G06F 2203/014; G06F 2203/013; G06F 2203/015; G06F 3/014812; A63F 13/24; A63F 13/285
  USPC ........................................................ 345/156
  See application file for complete search history.

(56) References Cited

U.S. PATENT DOCUMENTS

| 2004/0207542 | A1 | 10/2004 | Chang et al. |
| 2005/0017947 | A1 | 1/2005 | Shahoian et al. |
| 2008/0163051 | A1* | 7/2008 | Olien ...................... G06F 3/016 715/702 |
| 2009/0085882 | A1 | 4/2009 | Grant et al. |
| 2010/0283731 | A1* | 11/2010 | Grant ...................... G06F 3/016 345/158 |
| 2011/0018696 | A1 | 1/2011 | Ryu et al. |

FOREIGN PATENT DOCUMENTS

GB  2508137 A  5/2014

* cited by examiner

*Primary Examiner* — Nicholas Lee
*Assistant Examiner* — Ngan T Pham Lu
(74) *Attorney, Agent, or Firm* — Miles & Stockbridge P.C.

(57) ABSTRACT

An advanced haptic gamepad is provided. A controller having a plurality of surfaces, and a haptic output device located within its housing and coupled to an isolated deformable region disposed at one of the plurality of surfaces is provided. The isolated deformable region expands and contracts in response to the haptic output device. In addition, a controller having a plurality of isolated surface regions, and a plurality of haptic output devices located within its housing and coupled to respective isolated surface regions is provided. Each of the isolated surface regions is configured to provide localized haptic effects.

20 Claims, 14 Drawing Sheets

300

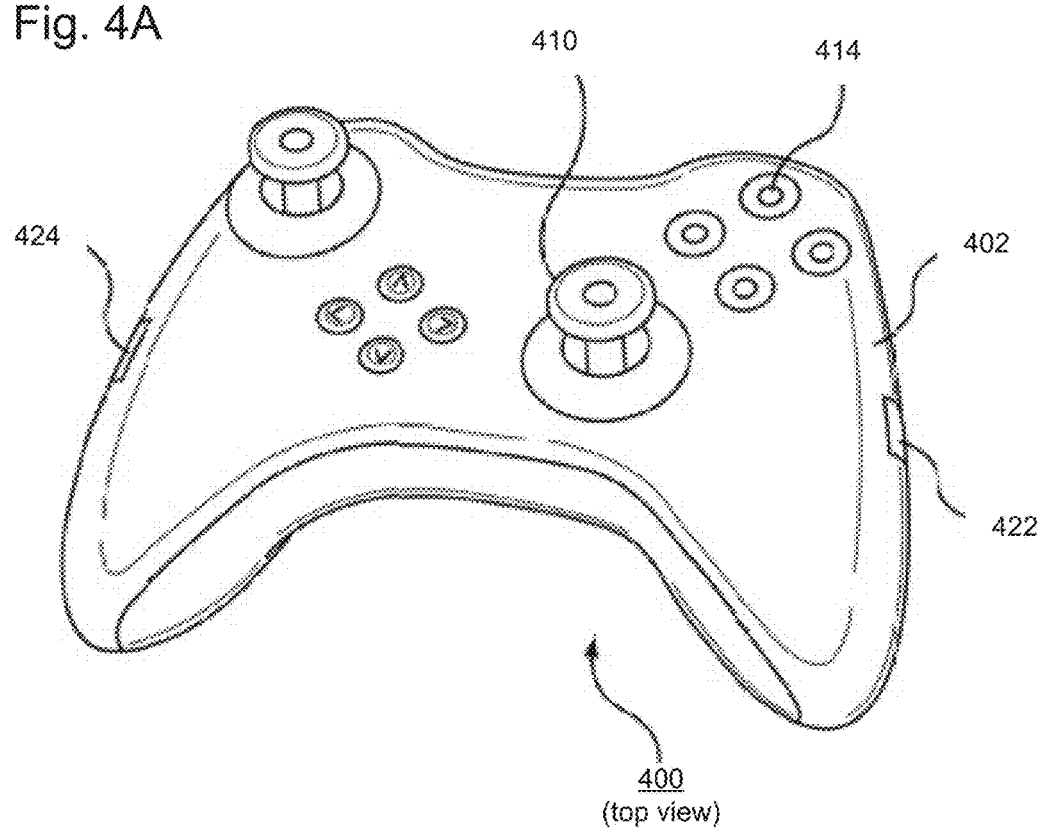

500

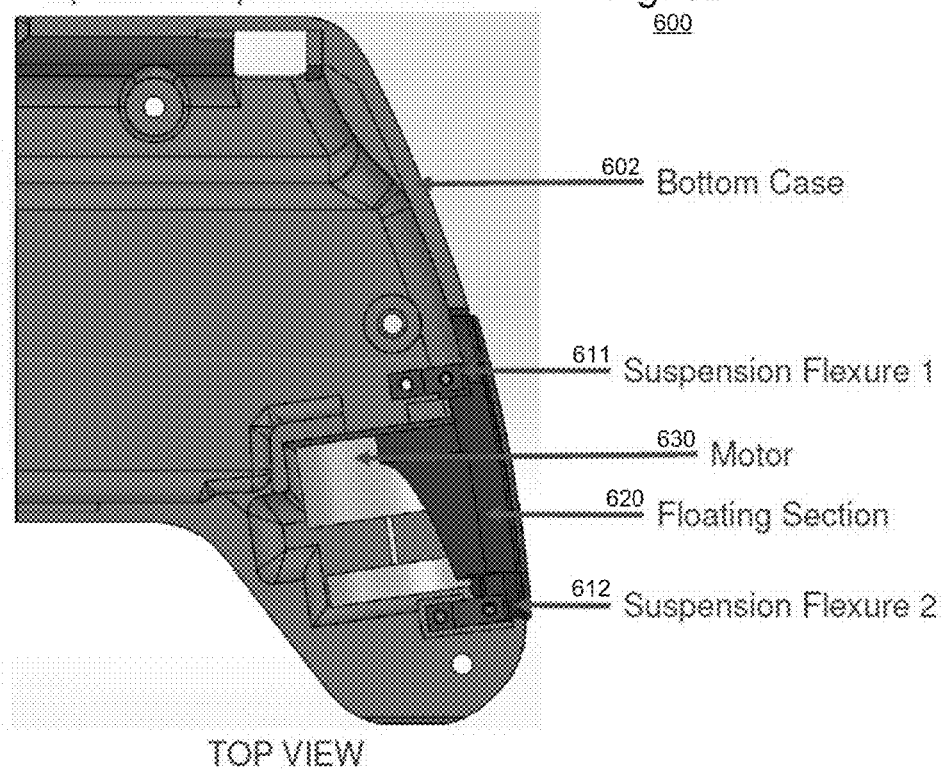

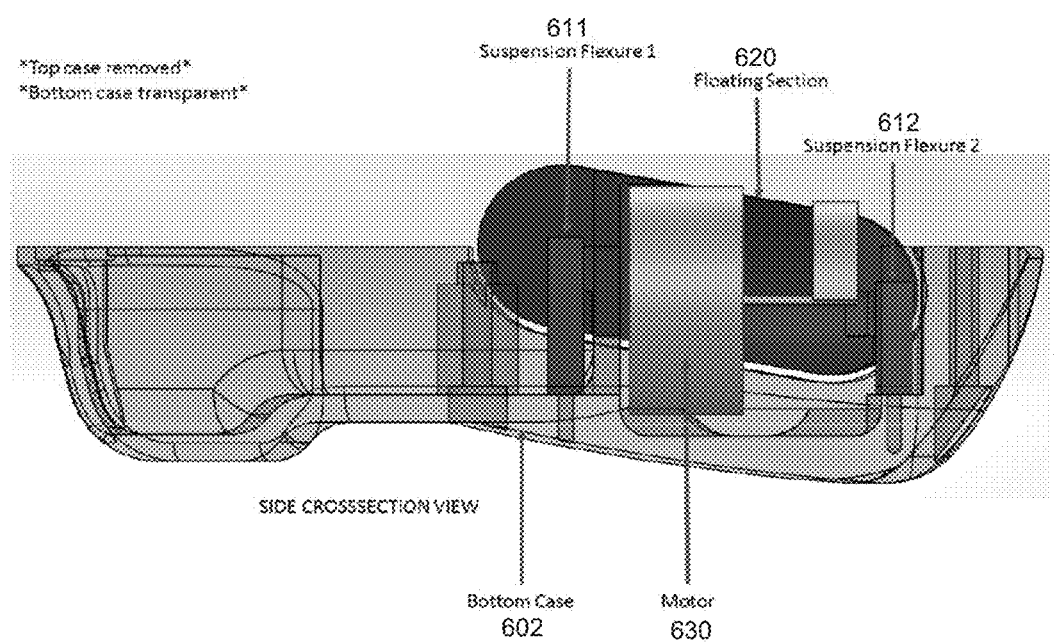

600

700
(top view)

Localized Region 700
(bottom view)

800

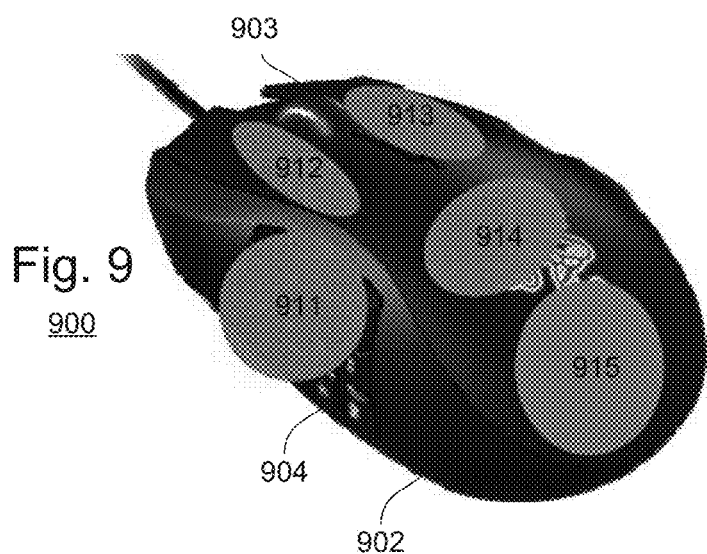

1000

HAPTIC CONTROLLER

PRIORITY APPLICATION

This application claims the benefits of U.S. Provisional Patent Application No. 62/078,502, filed on Nov. 12, 2014, which is incorporated herein by reference in its entirety.

FIELD OF INVENTION

The embodiments are generally directed to electronic devices, and more particularly, to electronic devices that produce haptic effects.

BACKGROUND

Video games and video game systems have become extremely popular. Video game devices or controllers typically use visual and auditory cues to provide feedback to a user. In some interface devices, kinesthetic feedback (e.g., active and resistive force feedback) and/or tactile feedback (e.g., vibration, texture, temperature variation, and the like) may be provided to the user. In general, such feedback is collectively known as "haptic feedback" or "haptic effects." Haptic feedback provides cues that enhance and simplify a user's interaction with a video game controller, or other electronic device. For example, haptic effects may provide cues to users of video game controllers or other electronic devices to alert the user to specific events, or provide realistic feedback to create greater sensory immersion within a simulated or virtual environment.

Other devices in which a user interacts with a user input element to cause an action also may benefit from haptic feedback or haptic effects. For example, such devices may include medical devices, automotive controls, remote controls, and other similar devices.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example, a controller having a plurality of surfaces, and a haptic output device located within its housing and coupled to an isolated deformable region disposed at one of the plurality of surfaces is provided. The example isolated deformable region may expand and/or contract in response to the haptic output device.

In another example, a controller having a plurality of isolated surface regions, and a plurality of haptic output devices located within its housing and coupled to respective isolated surface regions is provided. Each of the example isolated surface regions may be configured to provide localized haptic effects.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIGS. 4A and 4B illustrate different views of controller according to an example embodiment of the present invention.

FIGS. 6A, 6B, 6C, and 6D illustrate alternative detailed views of an isolated surface structure according to an example embodiment of the present invention.

FIG. 9 illustrates a haptic mouse according to another example embodiment of the present invention.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, a variety of user interfaces and methods for using a device are described. In some embodiments, the device is a portable electronic device (e.g., a game controller, console, mobile phone, smartphone, tablet, etc.). It should be understood, however, that the user interfaces and associated methods may be applied to numerous other devices, such as personal computers, medical devices, laptops, and the like that may include one or more other physical user-interface devices, such as a keyboard, mouse, trackball, joystick, motion and orientation sensing devices, and the like.

Figure 1:
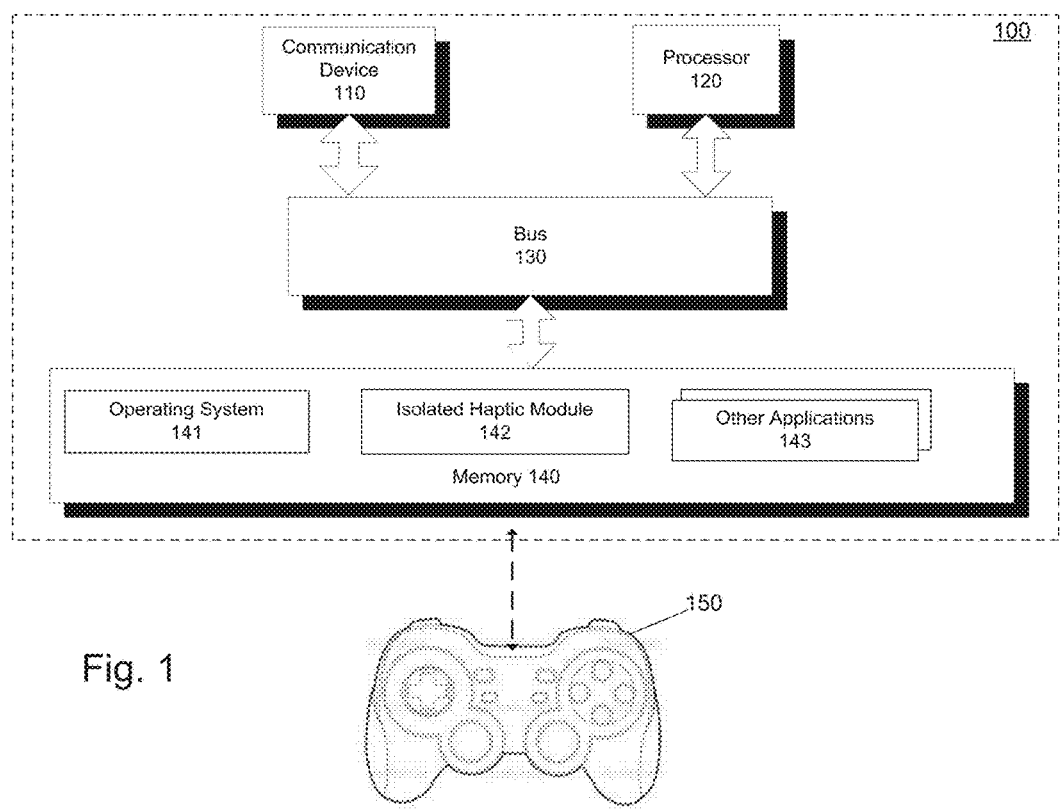
FIG. 1 illustrates a block diagram of a system according to an example embodiment of the invention.

FIG. 1 illustrates a block diagram of a system 100 according to an example embodiment of the invention.

System 100 may include a communication device 110 configured to transmit and/or receive data from remote sources. Communication device 110 may enable connectivity between processor 120 and other devices by encoding data to be sent from processor 120 to another device over a network (not shown) and decoding data received from another system over the network for processor 120.

For example, communication device 110 may include a network interface card that is configured to provide wireless network communications. A variety of wireless communication techniques may be used including infrared, radio, Bluetooth, Wi-Fi, and/or cellular communications. Alternatively, communication device 110 may be configured to provide wired network connection(s), such as an Ethernet connection.

Processor 120 may comprise one or more general or specific purpose processors to perform computation and control functions of system 100. Processor 120 may include a single integrated circuit, such as a micro-processing device, or may include multiple integrated circuit devices and/or circuit boards working in cooperation to accomplish the functions of processor 120. In addition, processor 120 may execute computer programs, such as operating system 141, isolated haptic module 142, and other applications 143, stored within memory 140.

System 100 may include memory 140 for storing information and instructions for execution by processor 120. Memory 140 may contain various components for retrieving, presenting, modifying, and storing data. For example, memory 140 may store software modules that provide functionality when executed by processor 120. The modules may include an operating system 141 that provides operating system functionality for system 100. The modules may further include isolated haptic module 142 that modifies a haptic effect experienced at isolated surface regions of controller 150. In certain embodiments, isolated haptic module 142 may comprise a plurality of modules, where each module provides specific individual functionality for modifying a haptic effect experienced at an isolated surface region. System 100 also may include one or more additional application modules 143 that include additional functionality, such as peripheral firmware configured to provide control functionality for a peripheral device, such as controller 150 (e.g., a gamepad).

Non-transitory memory 140 may include a variety of computer-readable medium that may be accessed by processor 120. In the various embodiments, memory 140 may include volatile and nonvolatile medium, removable and non-removable medium. For example, memory 140 may include any combination of random access memory ("RAM"), dynamic RAM (DRAM), static RAM (SRAM), read only memory ("ROM"), flash memory, cache memory, and/or any other type of non-transitory computer-readable medium.

Although shown as a single system, the functionality of system 100 may be implemented as a distributed system. For example, memory 140 and processor 120 may be distributed across multiple different computers that collectively comprise system 100. In one embodiment, system 100 may be part of a device (e.g., personal computer, console, video game console, etc.), and system 100 provides isolated haptic effect functionality for the device. In another embodiment, system 100 may be separate from the device, and may remotely provide the aforementioned functionality for the device.

System 100 may be operably connected to controller 150. Controller 150 may be a peripheral device configured to provide input to the system 100. Controller 150 may be operably connected to system 100 using either a wireless connection or a wired connection. Controller 150 also may include a local processor configured to communicate with system 100 using either a wireless connection or a wired connection. Alternatively, controller 150 may be configured to not include a local processor, and all input signals and/or output signals associated with controller 150 may be processed by the components of system 100.

Controller 150 may further include one or more digital buttons, one or more analog buttons, one or more bumpers, one or more directional pads, one or more analog or digital sticks, one or more driving wheels, and/or one or more user input elements that can be interacted with by a user, and that can provide input to system 100. Controller 150 may also include one or more analog or digital trigger buttons (or "triggers") that can further be interacted with by the user, and that can further provide input to system 100. As is described below in greater detail, controller 150 can further include a motor, or another type of actuator or haptic output device, configured to exert a bi-directional push/pull force on at least one trigger of controller 150.

Controller 150 can also include one or more actuators, or other types of haptic output devices. The local processor of controller 150, or processor 120 in embodiments where controller 150 does not include a local processor, may transmit a haptic signal associated with a haptic effect to at least one actuator of controller 150. The actuator, in turn, outputs haptic effects such as vibrotactile haptic effects, kinesthetic haptic effects, or deformation haptic effects, in response to the haptic signal. The haptic effects can be experienced at a user input element (e.g., a digital button, analog button, bumper, directional pad, analog or digital stick, driving wheel, or trigger) of controller 150. Alternatively, the haptic effects can be experienced at an outer surface of controller 150.

The actuator may be, for example, an electric motor, an electro-magnetic actuator, a voice coil, a shape memory alloy, an electro-active polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, or an ultrasonic vibration generator. In some instances, the actuator may include an actuator drive circuit.

In some embodiments, the actuator design may be configured to create directional inertial haptic effects, such as haptic effects produced along an axis. Here, multiple magnetic components may be suspended in a gel such that two sets of magnets may cause the magnetic components to move along two independent directions.

An actuator is an example of a haptic output device, where a haptic output device is a device configured to output haptic effects, such as vibrotactile haptic effects, electrostatic friction haptic effects, temperature variation, and/or deformation haptic effects, in response to a drive signal. In alternate embodiments, the one or more actuators within controller 150 can be replaced by some other type of haptic output device. In some embodiments, a speaker located within controller 150 and the like may be configured as a haptic output device. In some alternative embodiments, haptic output devices may be configured to provide both audio and vibration outputs.

Controller 150 may further include one or more speakers. The local processor of controller 150, or processor 120 in embodiments where controller 150 does not include a local processor, may transmit an audio signal to at least one speaker of controller 150, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 150 can further include one or more sensors. A sensor may be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor may further be configured to convert the detected energy, or other physical property, into an electrical signal, or any signal that represents virtual sensor information, and controller 150 can send the converted signal to the local processor of controller 150, or processor 120 in embodiments where controller 150 does not include a local processor.

Figure 2:
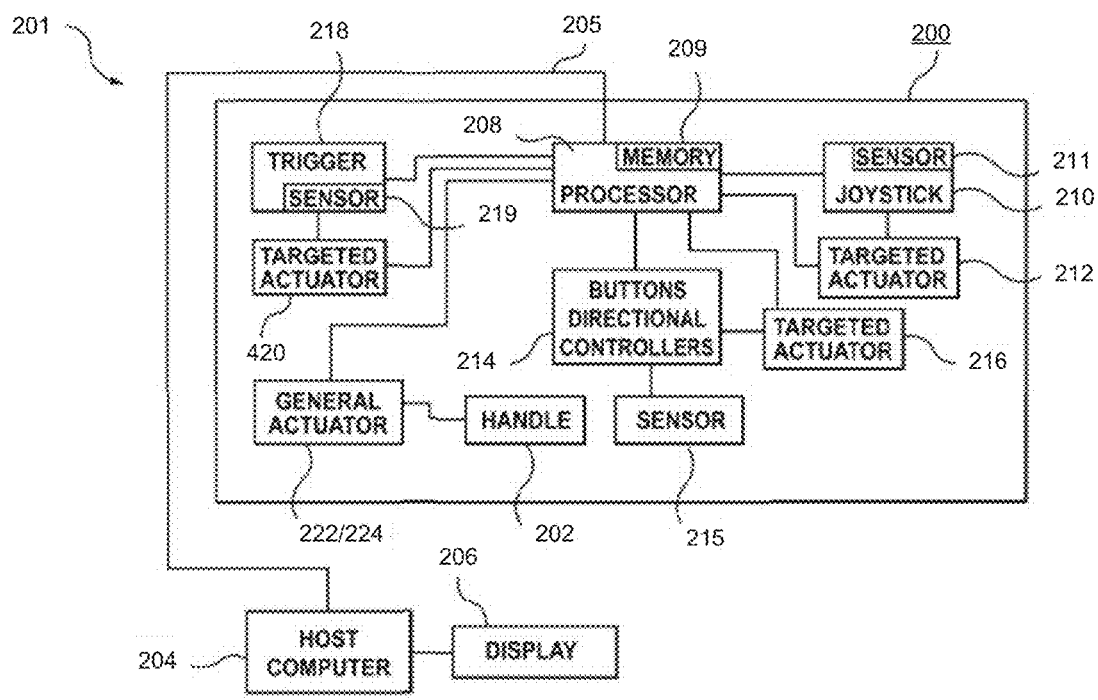
FIG. 2 illustrates a functional block diagram of controller according to an example embodiment of the present invention.

FIG. 2 illustrates a functional block diagram of a controller 200 according to an example embodiment of the present invention.

As illustrated in FIG. 2, controller 200 may include one or more of a variety of user input elements. A user input element may refer to any interface device manipulated by the user to interact with host computer 204. Example user input elements include analog or digital joy stick 210, button 214, trigger 218, and the like. As understood by one of ordinary skill in the art, one or more of each user input element may be included on controller 200. For example, the present description of trigger 218 does not limit controller 200 to a single trigger. Similarly, those skilled in the art understand that multiple analog or digital sticks, buttons, and other user input elements may be used.

Controller 200 may include local process 208. Local processor 208 may exchange commands and data with host computer 204 via connection 205. Connection 205 may be a wired or wireless connection using one or more communication protocols known to those skilled in the art. In some instances, controller 200 may be alternatively configured to not include local processor 208. Here, input/output signals from controller 200 may be handled and processed directly by host computer 204. Host computer 204 may be a gaming device console and display device 206 may be screen which is operably coupled to the gaming device console. In some instances, host computer 204 and display device 206 may be combined into a single device.

Controller 200 may include targeted actuators 212, 216, 220 (e.g., motors) to directly drive each of the user input elements thereof as well as one or more general or rumble actuators 222, 224 operably coupled to housing 202 in a location where a hand of the user is generally located. More particularly, analog or digital stick 210 includes a targeted actuator or motor 212 operably coupled thereto, button 214 includes a targeted actuator or motor 216 operably coupled thereto, and trigger 218 includes a targeted actuator or motor 220 operably coupled thereto. In addition to a plurality of targeted actuators, controller 200 includes a position sensor operably coupled to each of the user input elements thereof. More particularly, analog or digital stick 210 includes a position sensor 211 operably coupled thereto, button 214 includes a position sensor 215 operably coupled thereto, and trigger 218 includes a position sensor 219 operably coupled thereto. Local processor 208 is operably coupled to targeted actuators 212, 216, 220 as well as position sensors 211, 215, 219 of analog or digital stick 210, button 214, and trigger 218, respectively. In response to signals received from position sensors 211, 215, 219, local processor 208 instructs targeted actuators 212, 216, 220 to provide directed or targeted kinesthetic effects directly to analog or digital stick 210, button 214, and trigger 218, respectively. Such targeted kinesthetic effects are discernible or distinguishable from general or rumble haptic effects produced by general actuators 222, 224 along the entire body of the controller. The collective haptic effects provide the user with a greater sense of immersion to the game as multiple modalities are being simultaneously engaged (e.g., video, audio, and haptics).

Figure 3:
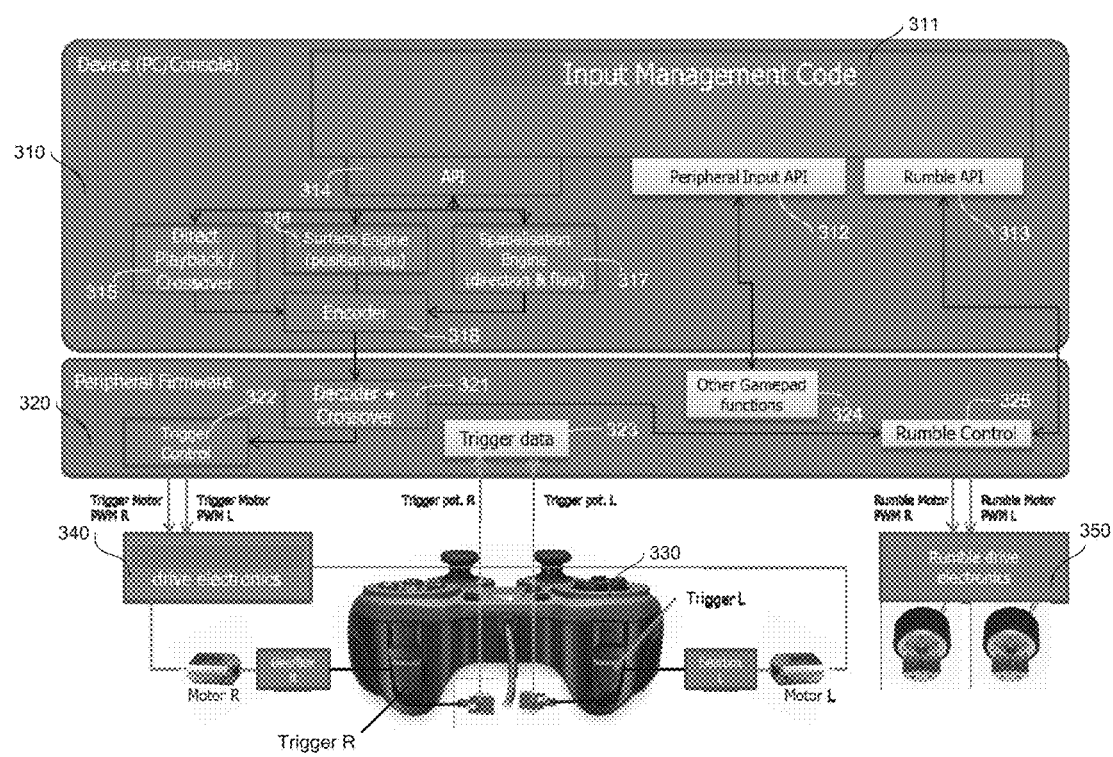
FIG. 3 illustrates a block diagram of a haptic effect software stack according to an example embodiment of the present invention.

FIG. 3 illustrates a block diagram of a haptic effect software stack 300 according to an example embodiment of the present invention. As shown in FIG. 3, software stack 300 includes device modules 310, peripheral firmware modules 320, controller modules 330, drive modules 340, and rumble drive modules 350. Haptic effect software stack 300 is implemented on a system, such as system 100 of FIG. 1.

Device modules 310 may include a variety of modules such as input management code 311, peripheral input application programming interface ("API") 312, rumble API 313, isolated haptic effect API 314, direct playback/crossover 315, isolated surface engine 316, spatialization engine 317, and encoder 318.

Input management code 311 may include a set of computer-readable instructions that manage input provided by controller 330 in the context of a game application, or other type of application, executed within a device.

Peripheral input API 312 may include a set of computer-readable functions or routines that enable game input management code 311 to interact with peripheral firmware 320 in order to receive and manage input provided by controller 330.

Rumble API 313 may include a set of computer-readable functions or routines that enable input management code 311 to interact with peripheral firmware 320 in order to transmit rumble instructions to one or more rumble motors or rumble actuators of controller 330 (e.g., rumble motors L and R of FIG. 3). In addition, a rumble instruction may cause a rumble motor or rumble actuator of controller 330 to produce a general or rumble haptic effect.

Isolated haptic effect API 314 (identified in FIG. 3 as "API") may include a set of computer-readable functions or routines that are accessible to input management code 311 and that enable input management code 311 to interact with peripheral firmware 320 in order to transmit haptic instructions to controller 330. Example instructions include haptic instructions to one or more isolated surfaces of controller 330. In addition, a haptic instruction may cause one or more targeted motors or targeted actuators of controller 330 to produce a haptic effect at one or more user input elements of controller 330.

Isolated haptic effect API 314 also may store one or more haptic effect definitions. A haptic effect definition is a data structure that includes haptic data, such as a haptic signal, that is pre-defined and that can be stored within a storage, such as a haptic file or haptic stream, and that can be sent to one or more rumble motors, rumble actuators, targeted motors, or targeted actuators, to produce a haptic effect at a component, or user input element, of controller 330. The haptic data can include one or more attributes of the corresponding haptic effect, where the attributes can be stored as parameters. Example parameters of a haptic effect definition may include an amplitude parameter, a frequency parameter, a waveform parameter, an envelope parameter, a magnitude (or strength) parameter, and a duration parameter.

Isolated haptic effect API 314 may enable game input management code 311 to interact with direct playback/crossover 315, trigger engine 316, and spatialization engine 317, and may further manage direct playback/crossover 315, trigger engine 316, and spatialization engine 317 according to requests invoked by game input management code 311. Further, isolated haptic effect API 314 may store data used for communication with peripheral firmware 320, and used for generation of one or more isolated haptic effects.

Direct playback/crossover 315 may receive haptic data as input, produce haptic data as output, and transmit haptic data to one or more targeted motors, or targeted actuators, of controller 330 (e.g., motors L and R of FIG. 3). In some embodiments, direct playback/crossover 315 may output the input haptic data directly, without modifying a format of the input haptic data. This results in an "as-is" playback of the input haptic data. In other embodiments, direct playback/crossover 315 may convert the haptic data that is input from a first format to a second format, and can further output the converted haptic data. Depending on the type of playback, direct playback/crossover 315 may optionally use a programmable crossover to convert the haptic data. By converting the haptic data, device modules may deconstruct the haptic effect and playback the haptic effect at multiple actuators.

The format of the haptic data may be a haptic elementary stream ("HES") format. A HES format is a file or data format for representing haptic data that may be streamed to a device. The haptic data can be represented in a manner that is identical or similar to how uncompressed sound is represented, although the haptic data can be encrypted within the HES format.

Isolated surface engine 316 may receive haptic data, such as an isolated surface haptic effect definition, and may modify the haptic data based on user input data, such as trigger data 323. Trigger data is data that includes one or more parameters that indicate a position and/or range of one or more triggers of controller 330 (e.g., triggers L and R of FIG. 3). Isolated surface 316 may further transmit haptic instructions to controller 330. For example, isolated surface engine 316 may transmit haptic instructions to a variety of user-input elements and/or isolated surfaces of controller 330. As previously described, a haptic instruction may cause one or more targeted motors or targeted actuators of controller 330 to produce a haptic effect at one or more user-input elements and/or isolated surfaces of controller 330.

Spatialization engine 317 may receive haptic data, such as an isolated surface haptic effect definition, and may modify the haptic data based on spatialization data. Spatialization data may include data that indicates a desired direction and/or flow of a haptic effect, such as an ordering of haptic effects on respective user input elements and/or isolated surfaces. In certain embodiments, spatialization engine 317 may receive spatialization data that includes a direction and/or flow from input management code 311.

Spatialization engine 317 may modify the haptic data so that a haptic effect, such as a trigger haptic effect, is scaled for one or more rumble motors, or rumble actuators, of controller 330 (e.g., rumble motors L and R of FIG. 3), and that the haptic effect is also scaled for one or more targeted motors, or targeted actuators, of controller 330 (e.g., motors L and R, as illustrated in FIG. 3). In other words, spatialization engine 317 may modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 317 may scale one or more portions of the haptic effect. For example, spatialization engine 317 may scale haptic data that is sent to the motor or actuator that causes the haptic effect to be experienced, causing the haptic effect to be more pronounced (e.g., increased magnitude, duration, etc.). Additionally, spatialization engine 317 may scale haptic data that is sent to other motors or actuators, causing other haptic effects that are experienced at those motors or actuators to be less pronounced (e.g., decreased magnitude, duration, etc.). In some embodiments, spatialization engine 317 may modify the haptic data in real-time. Further, in some embodiments, spatialization engine 317 may have non-linear relationships between inputs and motor, or actuator, outputs in order to exaggerate an overall haptic effect.

Encoder 318 encodes haptic data received from direct playback/crossover 315, isolated surface engine 316, and/or spatialization engine 317 into a format. In one embodiment, the format may be an HES format. Encoder 318 may transmit the encoded haptic data to peripheral firmware 320.

Peripheral firmware 320 is firmware for one or more peripheral devices (e.g., controllers). Peripheral firmware 320 may include a variety of modules such as decoder and crossover 321, trigger control 322, trigger data 323, other functions 324, and rumble control 325.

Decoder and crossover 321 may receive the encoded haptic data from encoder 318 and decodes the encoded haptic data. In some embodiments, decoder and crossover 321 computes a programmable crossover in order to decode the encoded haptic data. Decoder and crossover 321 may compute the programmable crossover in real-time.

Trigger control 322 is a low-level control API for one or more targeted motors or targeted actuators of controller 330 (e.g., motors L and R of FIG. 3). Trigger control 322 may receive a trigger instruction and may convert the trigger instruction into a low-level trigger instruction for a specified targeted motor or targeted actuator of controller 330, and may transmit the low-level trigger instruction to the specified targeted motor or targeted actuator of controller 330. The low-level trigger instruction may cause the specified targeted motor or targeted actuator to produce a trigger haptic effect at a specified trigger of controller 330.

Trigger data 323, as previously described, is data that includes one or more parameters that indicate a position and/or range of one or more triggers of controller 330 (e.g., triggers L and R of FIG. 3). Trigger data 323 may be received from controller 330 by peripheral firmware 320. Peripheral firmware 320 may further store trigger data 323, and may further transmit trigger data 323 to device modules 310.

Other gamepad functions 324 may be functions of controller 330 managed by peripheral firmware 320. Such functions may include such functions as wired/wireless communications, input reporting, protocol implementation, power management, etc.

Rumble control 325 is a low-level control API for one or more rumble motors or rumble actuators of controller 330 (e.g., rumble motors L and R of FIG. 3). Rumble control 325 may receive a rumble instruction, may convert the rumble instruction into a low-level rumble instruction for a specified rumble motor or rumble actuator of controller 330, and may transmit the low-level trigger instruction to the specified rumble motor or rumble actuator of controller 330.

Controller 330 may include triggers L and R. Controller 330 may further include gear boxes L and R and motors L and R. Motor L and gearbox L are operably coupled to trigger L within controller 330. Likewise, motor R and gearbox R are operably coupled to trigger R within controller 330. When motor L receives a trigger instruction, motor L and gearbox L may collectively cause a trigger haptic effect to be experienced at trigger L. Likewise, when motor R receives a trigger instruction, motor R and gearbox R may collectively cause a trigger haptic effect to be experienced at trigger R. Peripheral firmware 320 may send trigger instructions to motors L and R of controller 330 using drive electronics 340.

Controller 330 may further include potentiometers L and R. Potentiometer L may detect a position and/or range of trigger L, and may further send the detected position and/or range of trigger L to peripheral firmware 320 as trigger data. Likewise, potentiometer R may detect a position and/or range of trigger R, and may further send the detected position and/or range of trigger R to peripheral firmware 320 as trigger data.

Controller 330 may further include rumble motors L and R. When rumble motor L receives a rumble instruction, rumble motor L causes a haptic effect to be experienced along a left component of controller 330. Likewise, when rumble motor R receives a rumble instruction, rumble motor R causes a haptic effect to be experienced along a right component of controller 330. Peripheral firmware 320 may send rumble instructions to rumble motors L and R using rumble drive electronics 350.

Figure 4B:
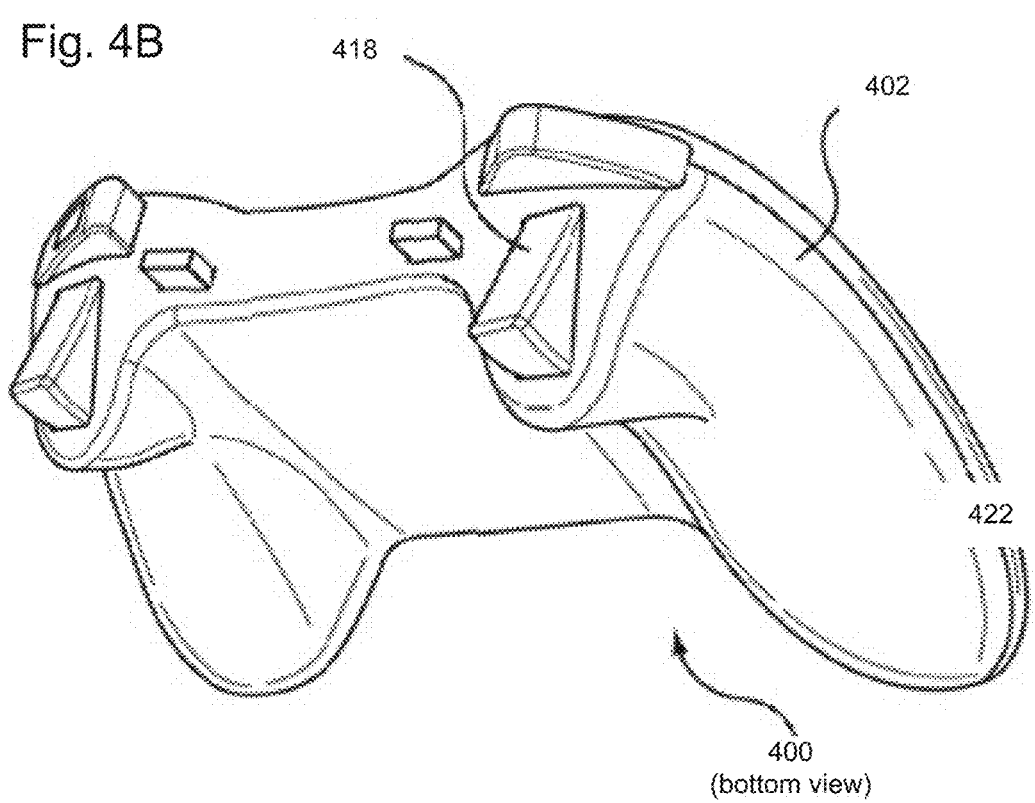

FIGS. 4A and 4B illustrate different views of a controller 400 according to an example embodiment of the present invention. As shown in FIG. 4A and FIG. 4B, controller 400 may include a variety of components such as housing 402, analog or digital joy stick 410, button(s) 414, trigger 418, and rumble actuators 422 and 424.

Housing 402 is shaped to easily accommodate user gripping of controller 400. Controller 400 is an example embodiment of a controller, and the embodiments of the invention may be readily applied to other controller shapes.

Figure 5:
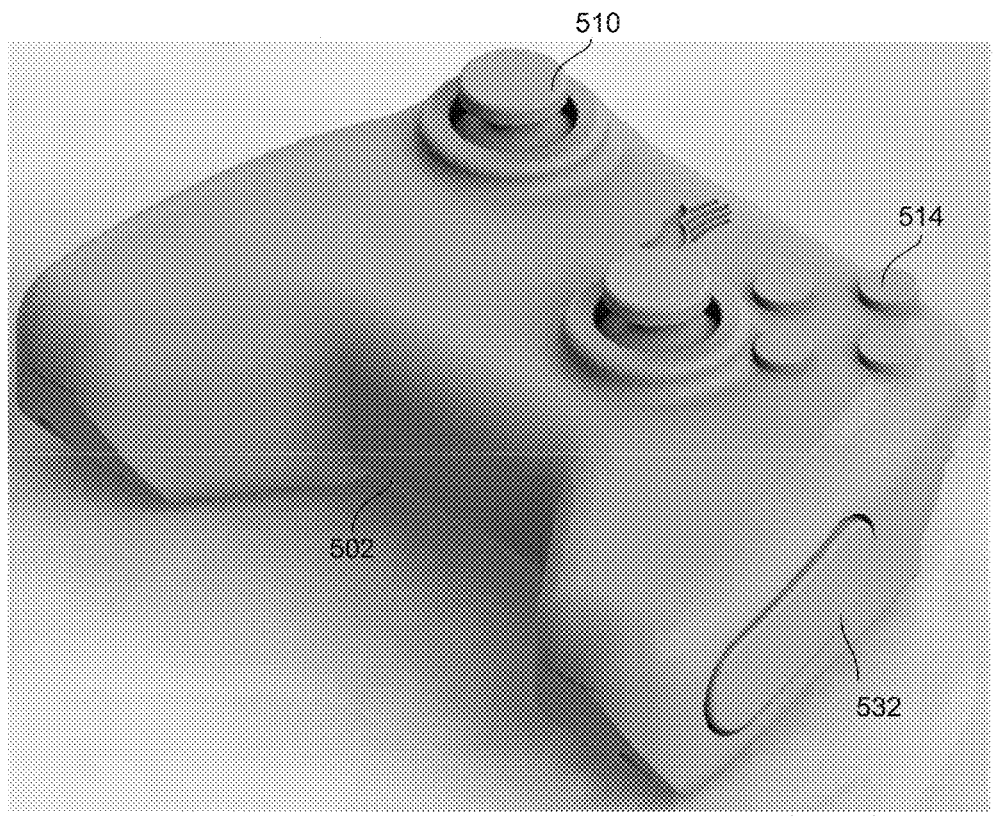
FIG. 5 illustrates a controller according to another example embodiment of the present invention.

FIG. 5 illustrates a controller 500 according to another example embodiment of the present invention. As shown in FIG. 5, controller 500 may include a variety of components such as housing 502, analog or digital joy stick 510, button(s) 514, and one or more isolated surface(s) 532.

Isolated surface 532 may enable isolated portions of controller 500 to be deformed by expanding and/or contracting. Although deformation haptic effects are being described, the embodiments are not so limited. Numerous other haptic effects may alternatively or additionally be applied to isolated surface 532. Example haptic effects include expansion, contraction, vibration, texture, temperature variation, rumble, and the like.

Use of isolated surface 532 provides advantages as compared to prior controllers. Here, the haptic effect may be isolated to a specific portion of controller 500 (e.g., left or right side) such that the user perceives the haptic effect only at the isolated surface 532 (i.e., not the whole controller, or not the entire controller housing 502). For example, use of isolated surface 532 may provide a wider range of haptic effects. In another example, use of isolated surface 532 provides improved spatialization. Here, both localized haptic effects as well as haptic effects that convey a sense of direction may be provided to a user (e.g., a more realistic effect of contacting a ball). In yet another example, use of isolated surface 532 may provide kinesthetic programmable haptics at surface(s) where the isolated surface 532 may expand and contract.

FIGS. 6A, 6B, 6C, and 6D illustrate alternative detailed views of an isolated surface structure 600 according to an example embodiment of the present invention. As shown, isolated surface structure 600 may include a variety of components such as housing 602, suspension flexures 611, 612, floating section 620, and motor 630.

The various components of isolated surface structure 600 may be configured to isolate the haptic effects (e.g., vibration and/or deformations applied to floating section 620 from housing 602. Accordingly, floating section 620 is indirectly coupled to housing 602 by suspension flexures 611, 612. When a haptic effect is applied to floating section 620, suspension flexures 611, 612 substantially dampen the haptic effects such that they are not applied to the housing 602. Additionally, or alternatively, a rubber ring or gasket (not shown) may surround floating section 620 to dampen the haptic effects.

Motor 630 may drive a plurality of haptic components 631, 632 in order to apply haptic effects to floating section 620. In some embodiments, motor 630 may be configured to drive a plurality of pins (not shown) positioned along floating section 630. Here, haptic components 631, 632 or pins may be individually driven to provide a wide range of haptic effects.

In addition, motor 630 may comprise a variety of motor types. For use in controller 600, motor 630 is preferably small, low-power, and lightweight. Typically, isolated surface structure 600, including motor 630, is lightweight (e.g., approximately 35 grams or less).

Example electric motors may include an electro-magnetic actuator, a voice coil, a shape memory alloy, an electro-active polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, an ultrasonic vibration generator, and the like.

Figure 6A:
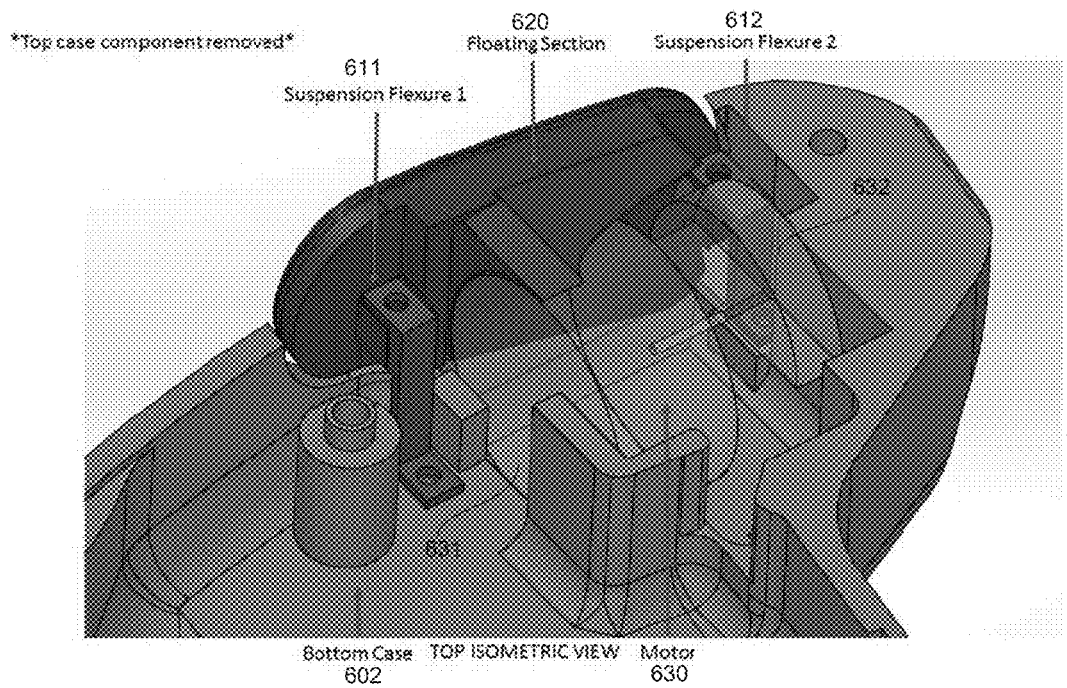
Figure 6D:
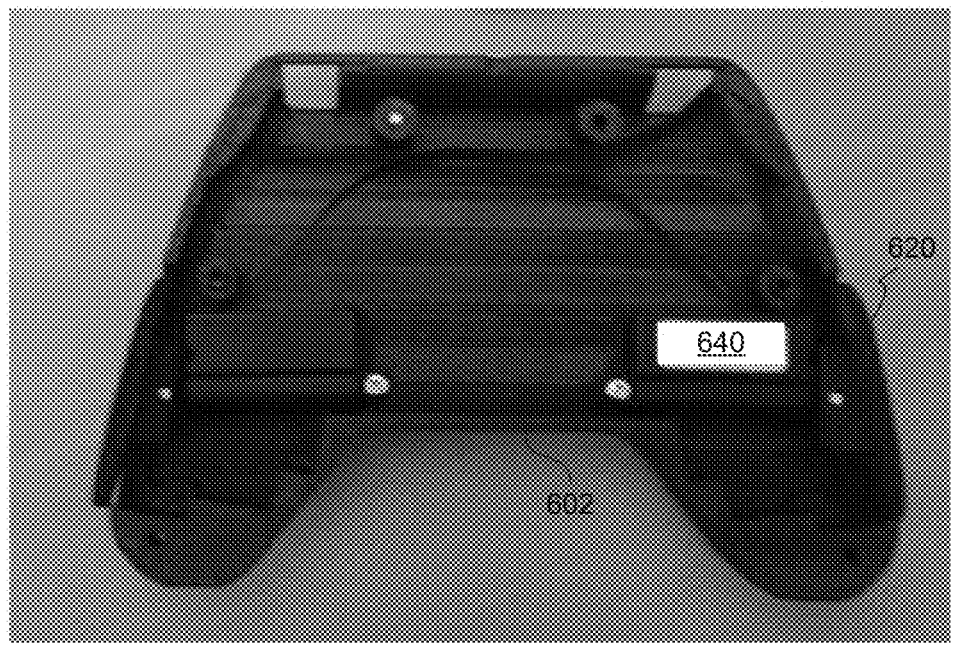

FIG. 6D illustrates an alternative detailed view of an isolated surface structure 600 configured to provide deformations such as expand and contract. As shown in FIG. 6D, a linear actuator 640 may be used to laterally move isolated floating section 620, or portions thereof. For example, linear actuator 640 may laterally move the entire floating section 620, or may laterally move just the upper or lower portions of the floating section 620. As discussed above, the isolated surface structure may further include a variety of components such as housing 602, suspension flexures, rubber ring or gasket, etc.

In some instances, motor 630 and/or actuator 640 may be grounded to isolated floating section 620. Isolated floating section 620 may be connected to the housing via the suspension mechanisms described herein or other mechanisms that dampen the haptic effects such that they are not applied to housing 602. Motor 630 and/or actuator 640 generate haptic effects and may be coupled directly to isolated floating section 620.

Although FIG. 6 illustrates an example isolated surface structure 600, other configurations are also feasible. For example, hinge-like and cam-like designs may be used. In another example, the number, size, and shape of the isolated region(s) may be varied. In addition, isolated surface structure 600 may be configured to provide a variety of haptic effects including expansion, contraction, vibration, texture, temperature variation, rumble, and the like.

Figure 7A:
FIGS. 7A and 7B illustrate different views of a controller according to another example embodiment of the present invention.
Figure 7B:
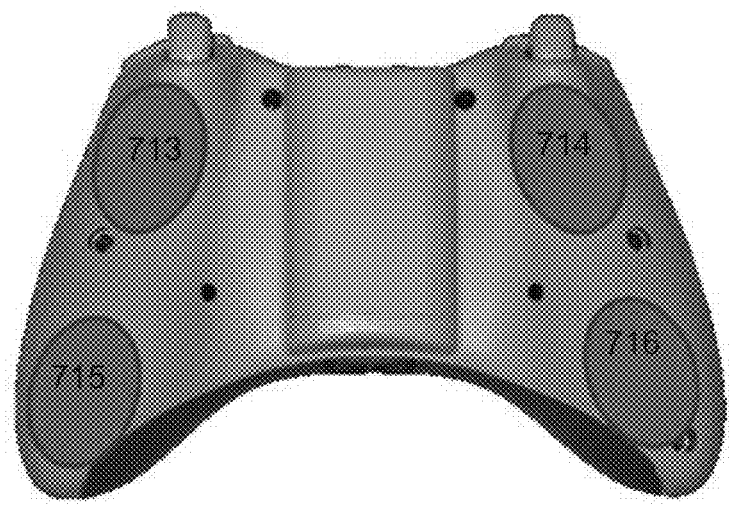

FIGS. 7A and 7B illustrate different views of a controller 700 according to another example embodiment of the present invention. In addition to the housing, analog or digital stick, button(s), and rumble actuators described in connection with FIGS. 4A, 4B, and 5, controller 700 includes a plurality of isolated regions 711, 712, 713, 714, 715, and 716. Each of isolated regions 711-716 may be individually (i.e., separately) configured to provide one or more haptic effects (e.g., expansion, contraction, vibration, texture, temperature variation, rumble, and the like).

By using discrete localized areas of the controller 700 that may be individually manipulated to provide one or more haptic effects, enhanced and full spatialization may be provided. Controller 700 may produce spatialized haptic effects in which localized haptic feedback may be experienced by the user. For example, a user may perceive localized haptic effects that are provided at one or more localized regions 711-716 the controller 700. Such localized haptic effects may be distinct from general haptic effects applied directly to the housing of the controller. In another example, haptic effects may be applied to a subset of localized regions 711-716 to convey a sense of direction to a user (e.g., left or right sensation).

In addition, haptic effects may be applied to a subset of localized regions 711-716 by mapping what is happening to an avatar (e.g., game character) to respective localized regions 711-716 of controller 700. For example, if the avatar is hit on the top left, then the controller 700 may have a corresponding haptic effect on the top left localized region. In another example, a user hit on the left side may feel haptic effects at the localized regions on the left side, such as localized regions 711, 714, and 716. In yet another example, a user's ship hit on the upper right side may feel haptic effects at localized region 713.

In some embodiments, isolated regions 711-716 may be mechanically arranged so that each portion of controller 700 may be vibrated separately. Here, multiple or all isolated regions 711-716 of controller 700 may be configured to apply a haptic effect, not just particular region(s). Isolated regions 711-716 also may be locked together such that a haptic effect may be applied to a subset of regions as one unit. In addition, the housing of the controller may be co-molded with various materials of varying stiffness properties in order to isolate the vibration to each section. In some instances, individual user elements such as joysticks, buttons, and the like may also be isolated from the different sections of the gamepad housing.

In some embodiments, controller 700 may be mechanically divided into isolated portions. For example, the controller 700 may be divided into 8 vibration isolated portions or octants. In this example, a haptic effect may be applied to an upper left octant and may be substantially isolated from the other octants. Here, isolated portions or octants may be interconnected by an active suspension having adjustable stiffness to interconnect the isolated portions. In other words, isolated sections may have variable dampening means between them in order to isolate haptic effects to particular portions(s) of controller 700. The stiffness may be increased in order to effectively couple two or more adjacent isolated portions of the controller into a single portion.

Figure 8A:
FIG. 8A illustrates a controller according to another example embodiment of the present invention.

FIG. 8A illustrates a controller 800 according to another example embodiment of the present invention. As shown in FIG. 8A, controller 800 may include one or more isolated track pads 821, 822 as user input devices. The surface of each of track pads 821, 822 may include an isolated and/or deformable surface, as previously described.

Figure 8B:
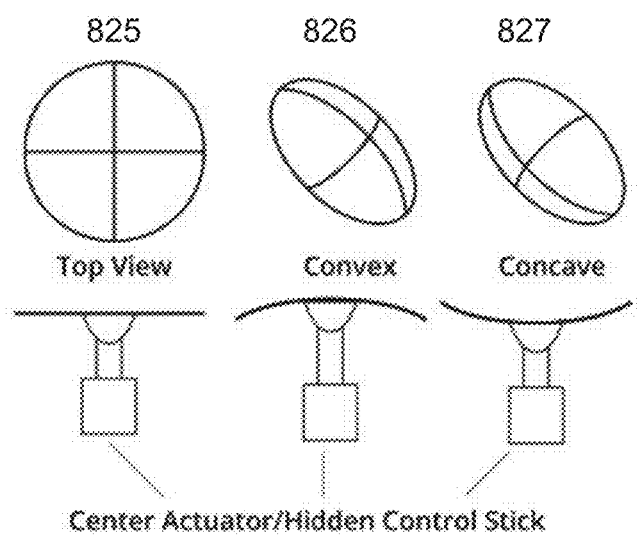
FIG. 8B illustrates alternative isolated track pad surfaces according to an example embodiment of the present invention.

FIG. 8B illustrates alternative isolated track pad surfaces 825, 826, 827 for use with controller 800 according to an example embodiment of the present invention. In addition, the surface of the isolated track pads 821, 822 may include a variety of structures, such as planar surface structure 825, convex surface structure 826, and concave surface structure 827, as shown in FIG. 8B.

Use of isolated track pads 821, 822 dynamically changes the feel and purpose of track pads. In addition, use of isolated track pads 821, 822 enhances ergonomics and better enables pressure-sensitive applications.

FIG. 9 illustrates a haptic mouse 900 according to another example embodiment of the present invention. In addition to housing 902 and rotary wheel 903, haptic mouse 900 includes a plurality of isolated regions 911, 912, 913, 914, and 915. Each of isolated regions 911-915 may be individually (i.e., separately) configured to provide one or more haptic effects (e.g., expansion, contraction, vibration, texture, temperature variation, rumble, and the like). In addition, the isolated regions may be configured to correspond to other portions of haptic mouse 900, such as rotary wheel 903 and/or keypad 904.

Figure 10:
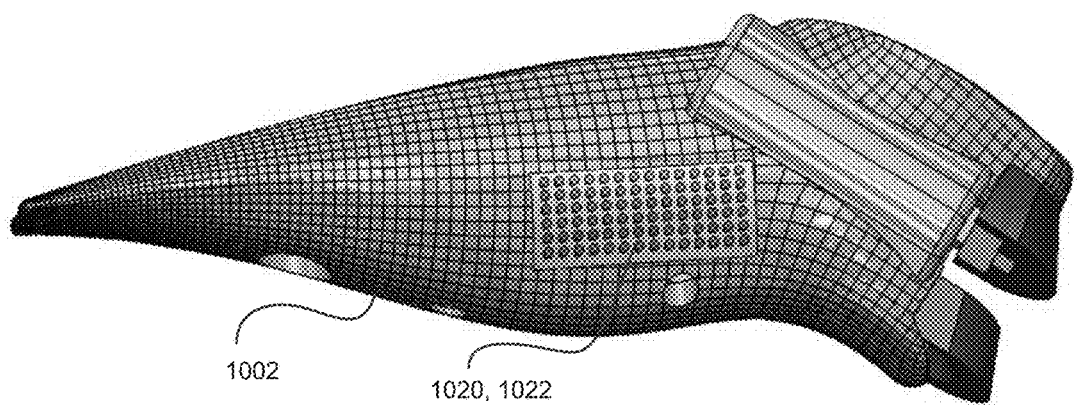
FIG. 10 illustrates a haptic motion controller according to another example embodiment of the present invention.

FIG. 10 illustrates a haptic motion controller 1000 according to another example embodiment of the present invention. In addition to housing 1002, haptic motion controller may include one or more isolated regions, such as isolated region 1020. In some instances, the surface of isolated regions in this and other embodiments may be textured, and include one or more curves, dimples, ridges, and the like. Here, isolated region 1020 is depicted with a plurality of textures 1022. In addition, isolated region 1020 may be individually (i.e., separately) configured to provide one or more haptic effects (e.g., expansion, contraction, vibration, texture, temperature variation, rumble, and the like). Additional isolated regions also may be configured to correspond to other portions of motion controller 1000.

Accordingly, enhanced haptic effects may be provided by adopting the various embodiments of the present invention. For example, isolated deformable regions that expand and contract in response to a haptic output device are provided. In another example, isolated surface regions may be configured to provide localized haptic effects are also described. Accordingly, improved spatialization via multiple discrete areas of a controller (e.g., gamepad) that can be separately vibrated is provided.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for controlling a haptic device, the method comprising:
   individually controlling at least two surfaces disposed on a housing of the haptic device, each respective surface having at least one isolated surface region; and
   individually controlling each of a plurality of haptic output devices located within the housing and coupled to respective isolated surface regions,
   wherein each of the isolated surface regions includes a plurality of suspension flexures configured to indirectly couple the isolated surface region to the housing such that the isolated surface region is configured to move in a lateral direction and to provide localized haptic effects.

2. The method of claim 1, wherein each of suspension flexures includes a Z-shaped mount.

3. The method of claim 2, wherein each of the plurality of suspension flexures dampens an output of respective haptic output devices to the housing.

4. The method of claim 1, wherein the haptic output devices include a linear actuator configured to drive a plurality of deformation components that cause expansion and contraction deformations along the isolated surface regions.

5. The method of claim 1, wherein the haptic output devices include an actuator configured to cause a vibration haptic effect on one of the isolated surface regions.

6. The method of claim 1, wherein the isolated surface regions provide an additional haptic effect that includes one of vibration, texture, temperature variation, or rumble effects.

7. The method of claim 1, wherein the isolated surface region is a track pad.

8. The method of claim 1, wherein the haptic device is one of a gamepad, console, mobile phone, tablet, motion controller, or haptic mouse.

9. A controller comprising:
   a housing having a plurality of surfaces, at least two of the surfaces having respective isolated surface regions; and
   a plurality of haptic output devices located within the housing and coupled to respective isolated surface regions,
   wherein each of the isolated surface regions includes a plurality of suspension flexures configured to indirectly couple the isolated surface region to the housing such that the isolated surface region is configured to move in a lateral direction and to provide localized spatial haptic effects.

10. The controller of claim 9, wherein each of suspension flexures includes a Z-shaped mount.

11. The controller of claim 10, wherein each of the plurality of suspension flexures dampens an output of its respective haptic output device to the housing.

12. The controller of claim 9 wherein the localized haptic effects include one or more of expansion, contraction, vibration, texture, temperature variation, and rumble effects.

13. The controller of claim 9, wherein localized haptic effects are applied to only one of the isolated surface regions.

14. The controller of claim 9, wherein localized haptic effects are applied to a subset of the isolated surface regions to convey a sense of direction to a user.

15. The controller of claim 9, wherein at least one of the isolated surface regions is a track pad.

16. The controller of claim 9, wherein haptic effects are applied to a subset of the isolated surface regions that are configured as a group.

17. The controller of claim 9, wherein the controller is one of a gamepad, console, mobile phone, tablet, motion controller, or haptic mouse.

18. A non-transitory computer readable storage medium storing one or more programs configured to be executed by a processor, the one or more programs comprising instructions for:
   individually controlling at least two surfaces disposed on a housing of a haptic device, each respective surface having at least one isolated surface region; and
   individually controlling a plurality of haptic output devices located within the housing and coupled to respective isolated surface regions,
   wherein each of the isolated surface regions includes a plurality of suspension flexures configured to indirectly couple the isolated surface region to the housing such that the isolated surface region is configured to move in a lateral direction and to provide localized haptic effects.

19. A controller comprising:
   a housing having a plurality of surfaces, one of the surfaces having an isolated surface region; and
   a haptic output device located within the housing and coupled to the isolated surface region,
   wherein the isolated surface region includes a plurality of suspension flexures configured to indirectly couple the isolated surface region to the housing such that the isolated surface region is configured to move in a lateral direction and to provide a localized haptic effect.

20. The method of claim 1, wherein the localized haptic effects include spatial haptic effects.

* * * * *